(12) United States Patent
Oosthoek et al.

(10) Patent No.: US 12,534,054 B2
(45) Date of Patent: Jan. 27, 2026

(54) FAIL OPERATIONAL ELECTRIC BRAKE SYSTEM

(71) Applicant: Astemo Netherlands B.V., Zaltbommel (NL)

(72) Inventors: Bart Oosthoek, Geldrop (NL); Asen-Antonov Marinov, Eindhoven (NL)

(73) Assignee: Astemo Netherlands B.V., Zaltbommel (NL)

( * ) Notice: Subject to any disclaimer, the term of this patent is extended or adjusted under 35 U.S.C. 154(b) by 592 days.

(21) Appl. No.: 17/907,615

(22) PCT Filed: Mar. 30, 2021

(86) PCT No.: PCT/NL2021/050204
§ 371 (c)(1),
(2) Date: Sep. 28, 2022

(87) PCT Pub. No.: WO2021/201676
PCT Pub. Date: Oct. 7, 2021

(65) Prior Publication Data
US 2023/0136605 A1    May 4, 2023

(30) Foreign Application Priority Data

Mar. 31, 2020  (EP) .................... 20167138

(51) Int. Cl.
*B60T 13/66* (2006.01)
*B60T 17/22* (2006.01)

(52) U.S. Cl.
CPC .......... *B60T 13/662* (2013.01); *B60T 17/221* (2013.01); *B60T 2270/402* (2013.01); *B60T 2270/413* (2013.01)

(58) Field of Classification Search
CPC ...... B60T 13/662; B60T 13/66; B60T 17/221; B60T 2270/402; B60T 2270/413;
(Continued)

(56) References Cited

U.S. PATENT DOCUMENTS 5,548,601 A    8/1996  Kato et al.
6,410,993 B1 *  6/2002  Giers ...................... B60T 8/321
                                              303/20
(Continued)

FOREIGN PATENT DOCUMENTS

DE      10316452 A1   10/2004
DE   102017204157 A1    9/2018
(Continued)

OTHER PUBLICATIONS

Ranieri, "International Search Report" issued in PCT/NL2021/050204; mailed Jun. 9, 2021; five pages.
(Continued)

*Primary Examiner* — Pamela Rodriguez
(74) *Attorney, Agent, or Firm* — Studebaker Brackett PLLC

(57) ABSTRACT

A brake control unit is provided comprising a primary control branch, a backup control branch, and mode control utilities, wherein the mode control utilities are configured to select in accordance with integrity diagnostic indications an operational mode of the brake control unit from a plurality of potential operational modes comprising at least a normal operational mode and a degraded operational mode, wherein respectively the primary control branch and the backup control branch are configured to generate a brake motor drive signal with their respective inverter being controlled by their respective control module in response to an external brake control signal, wherein the primary control module is configured to provide the integrity diagnostic indications in
(Continued)

that it includes at least a first and a second mutually cooperating primary control component that are configured to diagnose each other's integrity status, and in that it is further configured to diagnose an integrity status of the backup control branch by verifying a response signal of the backup control branch in response to a test signal.

20 Claims, 5 Drawing Sheets

(58) Field of Classification Search
CPC .. B60T 13/74; B60T 13/741; B60T 2270/206; B60T 2270/40; B60T 2270/404; B60T 2270/406
See application file for complete search history.

(56) References Cited

U.S. PATENT DOCUMENTS

| | | |
|---|---|---|
| 7,837,278 B2 | 11/2010 | Nilsson |
| 2006/0163939 A1 | 7/2006 | Kuramochi et al. |
| 2006/0232128 A1 | 10/2006 | Weiberle et al. |
| 2008/0091326 A1 | 4/2008 | Watanabe et al. |
| 2013/0282249 A1 | 10/2013 | Heise et al. |
| 2018/0056961 A1 | 3/2018 | Krueger et al. |
| 2018/0194353 A1 | 7/2018 | Kilmurray et al. |
| 2020/0039485 A1 | 2/2020 | Satoh et al. |

FOREIGN PATENT DOCUMENTS

| | | |
|---|---|---|
| JP | 2001-522331 A | 11/2001 |
| JP | 2019-026004 A | 2/2019 |
| WO | 2018/181807 A1 | 10/2018 |

OTHER PUBLICATIONS

Ranieri, "Written Opinion of the International Searching Authority" issued in PCT/NL2021/050204; mailed Jun. 9, 2021; six pages.
An Office Action; mailed by the Japanese Patent Office on Dec. 2, 2024, which corresponds to Japanese Patent Application No. 2022-559698 and is related to U.S. Appl. No. 17/907,615.

* cited by examiner

FAIL OPERATIONAL ELECTRIC BRAKE SYSTEM

TECHNICAL FIELD AND BACKGROUND

The present disclosure relates to an electric brake system, method of controlling the system, controller or software for such system, and vehicle comprising the brake system.

Brake-by-wire is typically used to denote a braking system in which the actuation and transmission devices are decoupled from each other. In a conventional hydraulic brake system, the brake pedal is the actuator and the hydraulic is the transmission device. Here, a distinction is made between the electrohydraulic brake, electro-pneumatic brake (in trucks) and the electric brake. Only the omission of the hydraulic or pneumatic makes the brake a real, so-called "dry" brake-by-wire application, since no fluid technology systems are used here. One reason for wanting to use this technology may be the slowness of currently used media in a brake system. With the help of pure electromechanical solutions, shorter response times may be achieved, which may also be reflected in the achievable braking distances. Another advantage may be a more favorable manufacturability of the brake-by-wire technology, since components in use in hydraulic systems such as a master cylinder, brake booster and an anti-lock component or more generally a brake modulation component are expensive to make, in comparison.

An electric vehicle brake typically has an electromechanical actuation device, configured to press a friction brake lining for braking against a brake body that is fixed against relative rotation to a vehicle wheel. The brake body is typically a brake disc or a brake drum. The actuation device typically has an electric motor and a rotation-to-translation conversion gear that converts a rotary driving motion of the electric motor into a translational motion for pressing the friction brake lining against the brake body. Worm gears, such as spindle gears or roller worm drives, are often used as rotation-to-translation conversion gears. It is also possible to convert the rotary motion into a translational motion by means of a pivotable cam, for instance. A step-down gear, for instance in the form of a planetary gear, is often placed between the electric motor and the rotation-to-translation conversion gear. Self-boosting electromechanical vehicle brakes have a self booster that converts a frictional force, exerted by the rotating brake body against the friction brake lining that is pressed for braking against the brake body, into a contact pressure, which presses the friction brake lining against the brake body in addition to a contact pressure that is exerted by the actuation device. Wedge, ramp, and lever mechanisms are suitable for the self boosting.

It is required that a control unit for an electric vehicle brake is reliable in that the risk of failure is limited to a minimum and that an occurrence of a failure does not immediately has serious consequences. The failure risk has a systematic aspect and a random aspect. The probability that an electronic component fails is strongly determined by the conditions during development and manufacturing. It is possible to reduce the probability by a proper development methodology, proper testing and verification and by providing for redundancy. Nevertheless failures due to random errors can never be fully excluded. The probability of a random failure is specified by the metric PMHF (Probability Metric of Random Hardware Failures). This metric indicates the probability density ($h^{-1}$) of occurrence of a failure. A related metric is expressed in FIT units. Electronic components in various ASIL classes (automotive safety integrity level classes) are available. Therein ASIL-D has the highest ranking with a PMHF value $<10^{-8}$ $h^{-1}$ corresponding to 10 FIT. ASIL-C has a PMHF value $<10^{-7}$ $h^{-1}$ corresponding to 100 FIT and so on.

The potential impact of a failure is further determined by the following aspects "severity", "exposure" and "controllability" as becomes apparent from the following example wherein a brake control unit is provided to control an electric brake for each wheel in response to an external brake control signal from a driver. An exemplary failure is that the brake control unit fails to control one of the electric brakes when it receives the brake control signal. This involves the hazard that the vehicle has to much yaw and/or lateral movement. The severity for this situation is indicated as S3, as the vehicle may become unstable and can run into the other lane of the road, therewith causing a crash with other traffic or objects. The exposure thereof is rated as E4, as it is a very common driving scenario. Typically roads have multiple lanes, and only for highways it is the case that a separation is provided between lanes for opposing traffic directions. The aspect controllability is rated as C3. Although the driver can control the vehicle movement to a certain extent by steering in an attempt to correct the yaw exerted by the failure of the brake system, this his can be very difficult, especially at medium and high speeds. A known approach to reduce the potential impact of a random failure is to provide the brake control unit as a so-called "1oot (one-out-of-two) system". A brake control unit of this type has a dual control channel each with its own auto-diagnostic unit Whereas this approach reduces the potential impact of a random failure, it involves a high cost of material.

Accordingly, there is a need to reduce the potential impact of a random failure in a more cost efficient manner.

SUMMARY

Aspects of the present disclosure relate to a brake control unit that comprises a primary control branch, a backup control branch, diagnostic utilities and mode control utilities.

The primary control branch has a primary inverter and a primary control module to control operation of the primary inverter.

The backup control branch has a backup inverter and a backup control module to control operation of the backup inverter.

The diagnostic utilities are configured to determine an integrity status of both control branches. The integrity status indicates whether or not a control branch meets integrity requirements. The integrity requirements are not met by a control branch if it is determined that it is dysfunctional in operation (i.e. does not function or functions with errors). The integrity requirements of a control branch also are not met if it is not in operation, but if it is likely or certain that it will be dysfunctional when set to its operational state.

The mode control utilities are configured to select in accordance with said determination an operational mode of the brake control unit from a plurality of potential operational modes comprising at least one of a normal operational mode and a degraded operational mode.

In the normal operational mode the primary control branch is configured to generate a brake motor drive signal with its inverter controlled by its control module in response to an external brake control signal.

In the degraded operational mode the backup control branch is configured to generate the brake motor drive signal with its inverter being controlled by its control module in response to the external brake control signal.

The primary control module includes at least a first and a second mutually cooperating primary control component that are part of said diagnostic utilities in that they are configured to diagnose each others integrity status. The primary control module also comprises diagnostic utilities configured to diagnose an integrity status of the backup control branch by verifying a response signal of the backup control branch in response to a test signal.

In some embodiments, the first and a second mutually cooperating primary control component diagnose each others integrity status by a Q&A watchdog procedure. Therein a first one of the primary control components periodically transmits a question message that requests a second one of the primary control components to perform a fixed series of arithmetic operations on a token value conveyed with the question message and to respond with a return message that conveys the resulting token value within a predetermined time-interval. If the resulting token value deviates from an expected token value, or is not received within the specified time interval by the first one of the primary control components that first one determines that the second one fails integrity requirements. In some exemplary embodiments the second one is also configured to determine that the first one fails integrity requirements if it does not receive a question message in a predetermined time-interval. In some embodiments the Q&A watchdog procedure is performed in a reciprocal manner in that both primary control components are configured to verify each others operation in this manner. In some embodiments, the first and the second mutually cooperating primary control component each perform respective functions to compute the control signal for the primary inverter in accordance with the external brake control signal. The mutually cooperating control components are used in a cost effective manner, as they ach have clear distinctive contribution to the operation of the primary control module.

In some embodiments, one of these primary control components is a micro-controller that directly or indirectly controls the drive signals for the inverter as part of a feedback loop responsive to a motor angle sensor. In exemplary embodiments thereof, another one of the primary control components is a power management controller.

In further embodiments similar Q&A watchdog procedures are applied with a larger number of primary control components. In this way it is possible not only to signal an error condition, but also to determine with more certainty which of the primary control components is actually suffering from a lack of integrity. In exemplary further embodiments with a primary control module having a first, a second and a third primary control component, if it is the case that the second and the third primary control component both diagnose a lack of integrity in the first primary control component and further confirm each others integrity it is likely that the first primary control component indeed has a potential defect.

As in the prior art approach the potential impact of a failure is strongly reduced. During normal operation, the brake motor is controlled by the primary brake control branch. As this primary control branch is provided with auto-diagnostic utilities, the primary control branch functions with high integrity. Should nevertheless a failure occur in the primary control branch then the mode control utilities will enable the backup control branch to take over control. The primary control module further comprises diagnostic utilities configured to diagnose an integrity status of the backup control branch by verifying a response signal of said branch in response to a test signal. This enables the primary control module to confirm that the backup control branch indeed is available for taking over brake control in case of a primary control branch failure. Due to the fact that the failure of the primary control branch does not directly influence the vehicle behavior, the potential impact is strongly reduced. Various, mutually non-exclusive options are possible for the mode control utilities. According to one option the mode control utilities alert the driver when changing the operation of the brake control unit to the degraded operational mode, so that the driver can take adequate steps, e.g. to drive to a garage or to reduce vehicle speed. According to an alternative or additional option measures are provided that directly change the operation of the vehicle to impose safer driving conditions or to prevent further driving as will be set out in more detail below. Due to the fact that backup control branch is only provided to temporarily control the brake in case of a failure of the primary control branch and the fact that its integrity is checked periodically or continuously during normal operation, a lower level of integrity is sufficient for the backup control branch. It does for example not require a Q&A watchdog diagnosis. A brake motor controlled by the brake control unit merely requires a single set of coils, which is driven by the primary control branch in the normal operational mode and driven by the backup control branch in the degraded operational mode.

In some embodiments the mode control utilities are configured to keep the backup control module operational during the normal operational mode, and the diagnostic utilities are configured to compare the response signal of the backup control branch with a reference response signal and reporting a lack of integrity of the backup control branch if it determines a substantial difference between said response signal and said reference response signal. With this measure, even in the absence of auto-diagnostic means for the backup control branch the risk is mitigated that the backup control branch is unavailable should in case of a failure of the primary control branch. The test signal is for example the external brake control signal. If the diagnostic means of the primary control branch determine that signals occurring in the backup control branch deviate significantly from corresponding signals in the primary control branch it determines a lack of integrity of the backup control branch. The response signal to be compared for example is indicative for a control signal provided by the backup control module to the backup inverter. In some embodiments, the diagnostic utilities compares this with a reference response signal that is indicative for a control signal provided by the primary control module to the primary inverter.

In some embodiments, the mode control utilities are configured to enable both the primary control branch and the backup control branch to generate a brake motor drive signal. In exemplary embodiments thereof, the brake control unit further comprises a respective phase cutoff switch that is controlled by the mode control utilities to select the brake motor drive signal from the primary control branch in the normal operational mode and to select the brake motor drive signal from the backup control branch in the degraded operational mode. In this case, a signal indicative for the brake motor drive signal provided by the backup control branch is suitable as a response signal. A signal indicative for the brake motor drive signal provided by the primary control branch is suitable as a reference signal. In these embodiments a diagnosis of the complete backup control branch is possible during the normal operational mode.

In some embodiments of the brake control unit the set of potential operational modes further comprises a power-up mode in which the diagnostic utilities provide a control signal to the backup control branch to cause the backup control branch to generate a brake motor drive signal. In the power-up mode, the mode control utilities temporarily enable the backup control branch to drive a brake motor with the brake motor drive signal. In the power-up mode the diagnostic utilities diagnose an operation of the backup control branch by verifying an operation of the brake motor in response to said the brake motor drive signal. In these embodiments, it is regularly verified that the backup control unit actually succeeds in properly controlling the brake motor. In some embodiments, this diagnostic procedure is combined with other diagnostic procedures, e.g. by comparing a response signal of the back-up backup control branch with a reference signal during normal operation as described above.

In some embodiments the plurality of potential operational modes includes a further degraded operational mode. In the further degraded operational mode the mode control utilities select the primary control branch as the source of the brake motor drive signal. The mode control utilities select the further degraded operational mode if the diagnostic utilities determine a lack of integrity with the backup control branch, but determine that the primary control branch meets integrity requirements. As in the degrade mode referred to above, the mode control utilities in some embodiments provide a signal to the driver and/or enforce safety restrictions to other control functions of the vehicle. In the further degraded operational mode, the mode control utilities in some embodiments fully disable operation of the backup control branch to avoid any potential interference with the operation of the primary control branch.

As discussed above a high integrity level is not required for the backup control branch. Nevertheless, in some embodiments, limited auto diagnostic capabilities are provided therein, including one or more of checksum verification and detection of out-of bound signals.

The at least a first and a second mutually cooperating primary control component that are configured to diagnose each others integrity status for example comprise a power management controller and a micro controller responsible for feedback control of the motor. Accordingly each of the primary control components in the primary control branch has a distinct functionality and in addition has the function to diagnose the other one. A further extension is possible, wherein more than two primary control components are provided and each primary control component is configured to diagnose each others integrity.

A brake control unit as described above and an electric brake controlled by the brake control unit form an electric brake control system. In some embodiments, an electric brake control system for a vehicle comprises for each wheel such an electric brake controlled by a respective brake control unit. In exemplary embodiments thereof, the brake control units mutually cooperate.

As noted above, in some embodiments measures are provided that directly change the operation of the vehicle. For example an embodiment of a brake control unit is part of a vehicle control system that has one or more additional control units to control additional vehicle functions and wherein the brake control unit is configured to change an operational mode of at least one of said one or more additional control units in accordance with its own operational mode. In exemplary embodiments, the vehicle control system further comprises a speed control unit for controlling a speed of the vehicle. In certain exemplary embodiments of this vehicle control system the brake control unit imposes a maximum on the speed with which the speed control unit is enabled to drive the vehicle if the operational mode of the brake control unit is not the normal operational mode. Therewith the potential impact should it be the case that also a backup control branch failure occurs is strongly reduced. In that exceptional case, the restricted driving speed would better enable the driver to control the behavior of the vehicle by steering actions. In some of the exemplary embodiments, the maximum driving speed is gradually reduced to the restricted speed upon a transition from the normal operational mode to a degraded operational mode, so that the driver is not surprised and has the opportunity to properly respond. In some of the exemplary embodiments the maximum driving speed is reduced from the previous maximum to the restricted maximum in a time interval of a minute. Should it be the case that the current vehicle speed at the time of leaving the normal operational mode already is lower than the restricted maximum speed, then it is not necessary to impose a delay on restricting the maximum speed.

A driver having noticed a warning signal and/or experiencing the restricted maximum speed may be expected to drive the vehicle to the garage to have the brake control unit repaired or replaced once it is no longer in the normal operational mode. As a further or alternative precaution, the brake control unit is configured in some embodiments to cause the vehicle control system to discontinue vehicle operation upon determining that a predetermined time interval has lapsed and/or a predetermined distance was driven with the vehicle since its operational mode was no longer the normal operational mode. In some embodiments discontinuation takes place gradually, e.g. by gradually reducing the maximum speed to 0. In alternative embodiments a discontinuation is effected when the vehicle is at standstill. I.e. if the driver has parked the car and switched off power, further use is disabled, until the car is towed to the garage for repair or replacement of the brake control unit.

A method of controlling a brake motor of a vehicle as provided herein comprises generating a brake motor drive signal in response to an external brake control signal. The external brake control signal typically originates from a control element for control by the driver, such as a brake pedal or a manually controlled element. In alternative embodiments the external brake control signal is issued by a component in an autonomous driving system. In further alternative embodiments the external brake control signal is issued either under control by the driver or by a component in a semi-autonomous driving system. The method provided herein more particularly comprises:

providing a primary control branch, a backup control branch, and mode control utilities;

the primary control branch provided therein has a primary inverter and a primary control module to control operation of the primary inverter;

the backup control branch provided therein has a backup inverter and a backup control module to control operation of the backup inverter;

with the diagnostic utilities determining an integrity status of both control branches;

with said mode control utilities selecting an operational mode from a plurality of potential operational modes in accordance with said determination, the potential operational modes comprising at least one of a normal operational mode and a degraded operational mode;

during the normal operational mode enabling the primary control branch to exclusively generate the brake motor drive signal in response to the external brake control signal, in which normal operational mode the at least a first and a second mutually cooperating primary control component diagnose each others integrity status, and the primary control branch further diagnoses an integrity status of the backup control branch by verifying a response signal of said branch in response to a test signal;

during the degraded operational mode enabling the backup control branch to exclusively generate the brake motor drive signal in response to the external brake control signal;

providing the primary control branch comprises including therein at least a first and a second mutually cooperating primary control component which during operation diagnose each others integrity status. The primary control branch is further provided to diagnose an integrity status of the backup control branch by verifying a response signal of said branch in response to a test signal.

BRIEF DESCRIPTION OF THE DRAWINGS

These and other aspects of the present disclosure are described in more detail with reference to the drawings. Therein.

DETAILED DESCRIPTION OF EMBODIMENTS

Figure 1:
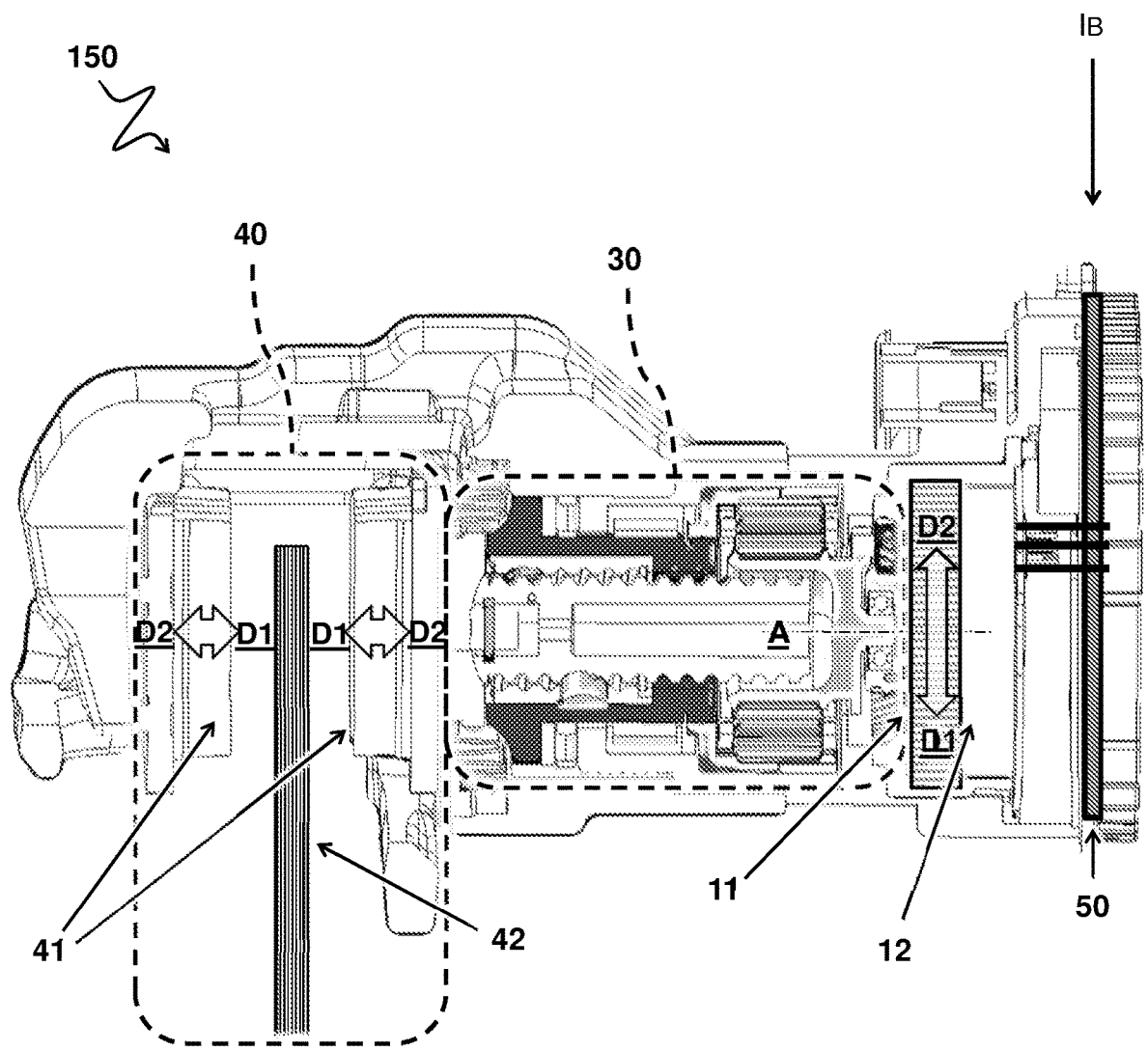
FIG. 1 illustrates an electric brake system.

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise. The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1 illustrates an electric brake system 150. As described herein, the brake system 150 comprises or couples to an electric brake motor 12 which transmits mechanical energy to a brake mechanism 40 via a brake transmission 30. Typically, the electric brake motor 12 is configured to transduce electrical power into mechanical power. An electric motor is understood as a machine that converts electrical energy into mechanical energy. For example, the electric motor operates through interaction between the motor's magnetic field and electric current in a wire winding to generate force in the form of rotation of an output shaft.

In some embodiments, the system comprises or is coupled to a brake mechanism 40 configured to apply braking to a wheel of a vehicle, or release braking of the wheel, depending on a mechanical state of the brake mechanism 40. For example, the mechanical state of the brake mechanism 40 is configured to vary anywhere between a (maximum) braked state, and a (fully) released state in which no braking is applied, or intermediate states in which at least some braking is applied.

Typically, a brake transmission 30 is configured to transmit the mechanical power from the electric brake motor 12 to the brake mechanism 40. In a preferred embodiment, as described herein, the brake transmission 30 comprises a self-locking mechanism. For example, the locking mechanism is configured to maintain the mechanical state of the brake mechanism 40 in absence of the electrical power to the electric brake motor 12. In some embodiments, self-locking occurs when the brake transmission is in a static state—i.e. not moving. For example, the brake transmission comprises a worm gear. Without being bound by theory, as long as a coefficient of friction between the gear and the worm is larger than the tangent of the worm's lead angle, the worm gear can be considered self-locking and will not back drive. Of course also other self-locking mechanisms are suitable.

In one embodiment, the brake system comprises a piston-type mechanism, but also other mechanisms (e.g. a floating type caliper brake) are suitable. The brake illustrated in FIG. 1 is an example of a floating type caliper brake. Typically, the brake transmission comprises a set of gears which are operationally connected to an output axle of the brake motor 12. In some embodiments, gears in the brake transmission are configured to drive a spindle which is housed in a spindle nut to move a piston. In an embodiment, the piston in turn is guided, e.g. by guide pins to drive the opening and closing movements of a caliper 41 which can be considered part of the brake mechanism 40. For example, in an embodiment the caliper is fitted with two opposing brake pads. The mechanical energy which is transmitted via the brake transmission 30 to the brake mechanism 40 is thus ultimately used to drive the two braking pads closer to each other to perform or activate a braking operation, and apart from each other to release of deactivate a braking operation. In some embodiments, the caliper 41 is fixed to a bracket by which the caliper 41 is to be suspended over a brake disc 42 of a wheel such that the brake disc is provided between the pads of the caliper. For example, the brake disc 42, is connected to at least one wheel of the vehicle, e.g. on a wheel axle directly connected to the wheel and brake disc. In some embodiments, e.g. as shown, a primary gear 11 is operationally connected to rotate with the brake transmission 30. For example, while braking is applied to the wheel via the brake transmission the primary gear 11 is rotated in a brake applying direction "D1". For example, while braking of the wheel is released, the primary gear 11 is rotated in an opposite, brake releasing direction "D2".

Figure 2:
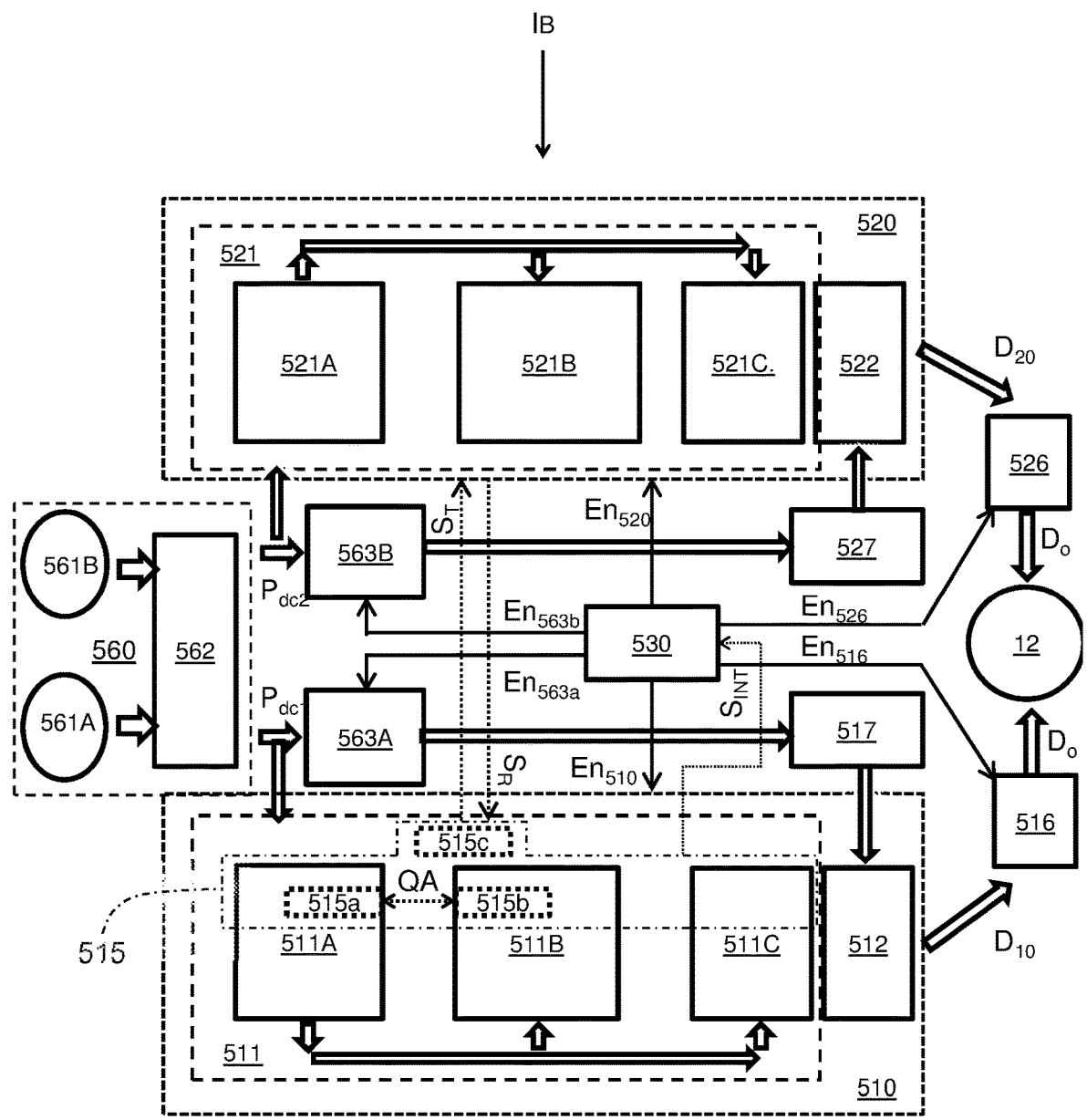
FIG. 2 schematically shows a brake control unit in an embodiment of the electric brake system.

FIG. 2 schematically shows a brake control unit 50 comprising a primary control branch 510, a backup control branch 520, diagnostic utilities 515 and mode control utilities 530. The primary control branch 510 has a primary inverter 512 and a primary control module 511 to control operation of the primary inverter. The backup control branch 520 has a backup inverter 522 and a backup control module 521 to control operation of the backup inverter. The diagnostic utilities 515 are configured to determine an integrity status $S_{INT}$ of both control branches. In accordance with the integrity status $S_{INT}$ determined by the diagnostic utilities 515 the mode control utilities 530 select an operational mode of the brake control unit from a plurality of potential operational modes. The plurality of potential operational modes comprises at least a normal operational mode and a degraded operational mode. In the normal operational mode the mode control utilities 530 enable the primary control branch 510 with an enable signal $En_{510}$ to generate from a supplied power $P_{dc1}$ a brake motor drive signal $D_{10}$ with its primary inverter 512 controlled by its primary control module 511 in response to an external brake control signal $I_B$. In that case the brake motor drive signal $D_{10}$ is provided as the brake motor drive signal $D_o$. In the degraded operational mode the mode control utilities 530 enable the backup control branch 520 with another enable signal $En_{520}$ to generate from the supplied power Pace a brake motor drive signal $D_{20}$ with its backup inverter 522 controlled by its backup control module 521 in response to the external brake control signal $I_B$. In that case the brake motor drive signal $D_{20}$ is provided instead as the brake motor drive signal $D_o$. Either the brake motor drive signal $D_{10}$ in the normal operational mode, or the brake motor drive signal $D_{10}$ in the degrade operational mode is provided as the control signal $D_o$ to the brake motor. In some embodiments, the enable signal $En_{510}$ is used to activate/deactivate the primary control branch 510 in its entirety. In some embodiments the enable signal has various signal components, with which the mode control utilities 530 are configured to selectively activate/deactivate parts of the primary control branch 510. Likewise in some embodiments the enable signal $En_{510}$ is used to activate/deactivate the backup control branch 520 in its entirety and in alternative embodiments the enable signal $En_{510}$ has various signal components to selectively activate/deactivate parts of the backup control branch 520. The mode controller is further configured to power on/off the power provided to the primary inverter 512 and the backup inverter 522 with control signals $En_{566a}$ and $En_{563b}$ respectively. Still further, the mode control utilities are configured to control phase cutoff switches 516, 526 with control signals $En_{516}$, $En_{526}$ respectively.

The primary control module 511 includes at least a first and a second mutually cooperating primary control component. In the embodiment shown the primary control module 511 comprises a primary power management controller 511A and a primary feedback controller 511B as first and second mutually cooperating primary control components. In the embodiment shown, the primary control module 511 comprises also a pre-driver 511C as a third primary control component that also cooperates with the primary power management controller 511A and the primary feedback controller 511B.

The mutually cooperating primary power management controller 511A and the primary feedback controller 511B are part of the diagnostic utilities 515 in that they are configured by a respective watchdog component 515a, 515b to diagnose each others integrity status. The watchdog components 515a, 515b perform a procedure wherein they periodically transmit to each other a question message Q with the request to perform a fixed series of arithmetic operations on a token value conveyed with the question message and to respond with a return message A that conveys the resulting token value within a predetermined time-interval. Either of the mutually cooperating control components is configured to signal a lack of integrity of the other one if the token value provided with the answer message deviates from an expected token value, or is not received within a specified time interval. In some embodiments either of the mutually cooperating control components is configured to signal a lack of integrity of the other one if it does not receive a question message within a specified time interval. The primary control module further comprises diagnostic utilities configured to diagnose an integrity status of the backup control branch 520 by verifying a response signal $S_R$ of said branch in response to a test signal $S_T$. In this way it is not necessary that the backup control backup control branch 520 has auto-diagnosis utilities. A very effective integrity verification is possible by providing the external brake signal $I_B$ as the test signal and to verify if the backup control branch 520 responds to this signal in the same manner as the primary control branch 510. Due to the fact that the primary control branch 510 is of high integrity and has auto-diagnostic capabilities it is presumed that the control signals serves as a reliable reference for comparison with those of the backup control branch 520.

In the embodiment shown, the backup control module 521 also comprises mutually cooperating control components. These comprise a backup power management controller 521A, a backup feedback controller 521B and a backup pre-driver 521C. In comparison to the corresponding primary components these backup components are of a lower integrity level. The primary components 511A, 511B and 511C are for example qualified as ASIL-D and the backup control components are for example qualified as ASIL-A. Contrary to the primary control components the backup control components are not configured to mutually perform a watchdog procedure. In an alternative embodiment a single backup control component is used for power management, feedback control and pre-driving functions.

In some embodiments of the brake control unit 50, the backup control branch 520 is fully operational in the normal operational mode, apart from the fact that it is not enabled to drive the brake motor. In that case the diagnostic utilities 515 of the primary control module 511 are capable to continuously monitor the integrity of the backup control branch 520. In some embodiments, the diagnostic utilities compare a response signal $S_T$ from the backup control branch 520 that is indicative for a signal CI2 provided by the backup control module 521 to the backup inverter 522 with a reference signal that is indicative for a control signal provided by the primary control module 511 to the primary inverter 512. According to one option, the signal to be compared are the inverter control signals proper. According to another option the signals to be compared are duplicated or modified versions thereof. In some embodiments, in the normal operational mode, the backup control branch 520 is operated at a lower frequency, or is periodically activated for a relatively short period in which it operates at a normal frequency.

In the embodiment shown in FIG. 2, the mode control utilities of the brake control unit 50 are configured to control a primary phase cut-off switch 516 and a backup phase cut-off switch 526 with control signals $En_{516}$ and $En_{526}$ respectively. During normal operational mode, the primary control branch 510 and the backup control branch 520 are both enabled to generate their brake motor drive signal $D_{10}$, $D_{20}$ respectively in some embodiments. The mode control utilities 530 however enable the primary control branch 510 to actually deliver its brake motor drive signal $D_{10}$ via the primary phase cut-off switch 516, and blocks the brake motor drive signal $D_{20}$ with the backup phase cut-off switch 526. In this embodiment the response signal $S_R$ of the backup control branch 520 to be verified by the diagnostic utilities 515 is a signal indicative for the brake motor drive signal $D_{20}$ provided by the backup control branch 520. The reference response signal with which this response signal $S_R$ is compared is a signal indicative for the brake motor drive signal $D_{10}$ provided by the primary control branch 510. In some embodiments, the signals are indicative for the brake motor drive signals $D_{10}$, $D_{20}$, for example, in that they are proportional thereto. In this way, the diagnostic utility 515c is configured to also verify the operation of the back-up inverter 522. In other embodiments the controlled phase cutoff switches 516 and 526 is absent, and instead, the mode control utilities 530 are configured to selectively enable one of the primary inverter 512 and the backup inverter 522 with control signals $En_{563a}$, $En_{563b}$ to the input power supply switches 563A, 563B. In still further embodiments the mode control utilities 530 are configured to selectively enable one of the primary inverter 512 and the backup inverter 522 by a respective control signal component in the control signals $En_{510}$. $En_{520}$.

In the embodiment of FIG. 2 an EMI-filter 517, 527 is provided in the power supply lines to the primary inverter 512 and the backup inverter 522 respectively. The EMI-filter 517 provided in the power supply line to the primary inverter is configured for a high-level interference suppression. The EMI-filter 527 provided in the power supply line to the backup inverter has modest interference suppression capabilities as the backup control branch 520 is only intended to be used temporarily and at a relatively low power level.

In the embodiment shown in FIG. 2, the power supply 560 has redundant elements to minimize the risk of a power failure. In this exemplary embodiment the power supply 560 comprises a main battery package 561A, a backup battery package 561B and a power source selector 562. The power source selector 562 is configured to select the main battery package 561A by default and to select the backup battery package 561B if it detects a failure of the main battery package 561A. Also in this case various mutually non-exclusive options are available. According to one option, upon detection of a failure of the main battery package 561A the mode control utilities 530 assume a degraded operational mode, urging the driver to have the power supply 560 repaired and/or restricting functionalities of the vehicle, e.g. restricting a maximum speed and/or a disabling further use of the vehicle after a predetermined time interval has passed or a predetermined number of kilometers has been driven with the vehicle since the transition to the degraded operational mode. As the backup battery package 561B is only intended for use during a short term it requires only a modest capacity as compared with that of the main battery package 561A. Nevertheless it helps to prevent serious consequences in the undesired event that the main battery package 561A fails. In some embodiments, the backup input power supply switch 563B is also controlled in the normal operational mode to provide a backup control branch supply power $P_{dc2}$ to the backup control branch 520, for example to enable an end to end diagnosis. E.g. in some embodiments, in the normal operational mode the backup control branch supply power $P_{dc2}$ is permanently available, so as to enable to diagnostic utilities 515 to permanently verify the integrity status of the backup control branch 520. Therewith the backup control branch 520 is operated as if it was actually used, possibly at a lower clock frequency, without allowing it to control the brake motor. In alternative embodiments, the backup input power supply switch 563B is used to periodically supply power to the backup control branch 520 during a relatively short time interval for performing an end to end diagnosis, while disconnecting power supply outside these relatively short time intervals.

Figure 3:
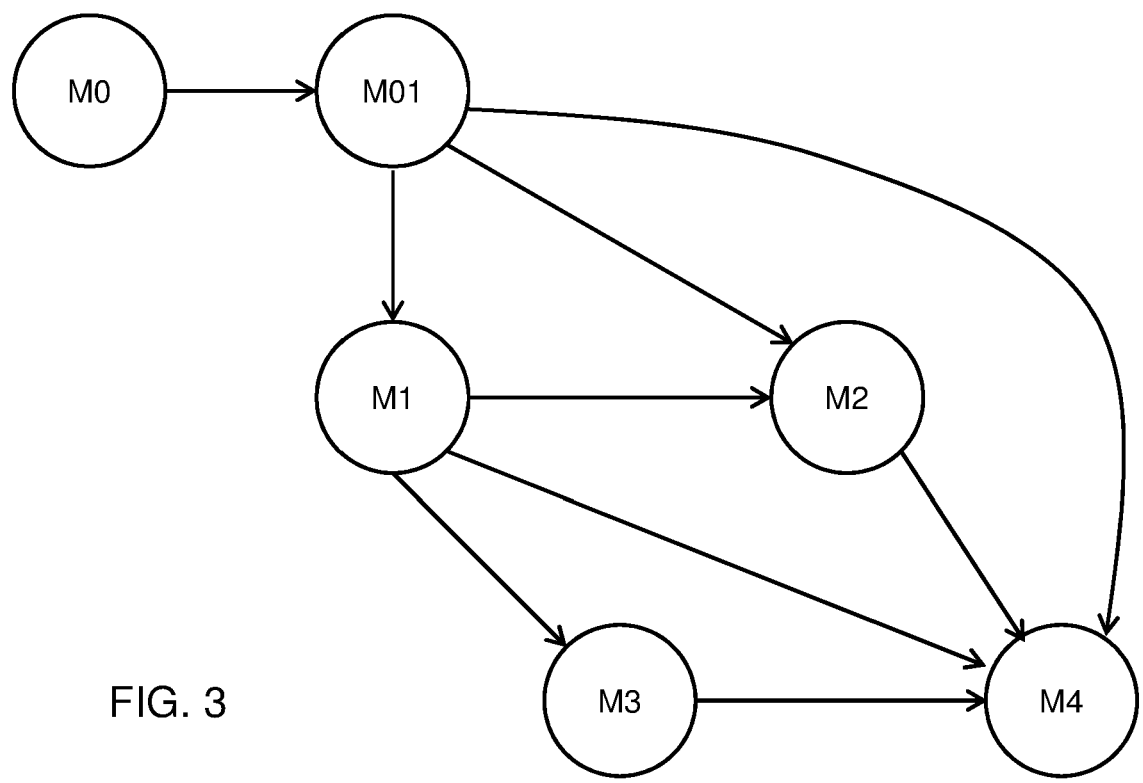
FIG. 3 schematically shows an exemplary operational mode diagram in an embodiment of the brake control unit.

FIG. 3 schematically shows an exemplary operational mode diagram for the mode control utilities 530 with a plurality of potential operational modes. Therein the nominal or normal operational mode is indicated as M1 and the degraded operational mode is indicated as M2. Reference M0 indicates the operational state when the brake control unit 50 is powered off. In the example shown, the plurality of potential operational modes comprises a power-up mode M01. Upon power up of the brake control unit 50 the mode control utilities 530 first assume this transitional mode M01 wherein the diagnostic utilities 515 provide a control signal to the backup control branch 520 to cause the backup control branch 520 to generate a brake motor drive signal $D_{20}$. Therewith the mode control utilities 530 temporarily enable the backup control branch 520 to drive the brake motor 12 with the brake motor drive signal $D_{20}$. The diagnostic utilities 515 therewith diagnose an operation of the backup control branch 520 by verifying an operation of the brake motor 12 in response to the brake motor drive signal $D_{20}$. In some embodiments, the diagnostic utilities sense a motor angle signal to determine whether or not the brake motor rotates. In some embodiments, the diagnostic utilities 515 also perform this procedure for the primary control branch 510 during the power-up mode M01. If the diagnostic procedure in operational mode points out that both the primary control branch 510 and the backup control branch 520 have the required integrity status, the mode control utilities 530 assume the normal operational mode M1. If it is determined, either during the power-up mode or during operation in the normal operational mode M1, that the primary control branch 510 suffers from a lack of integrity the mode control utilities 530 assume the degraded operational mode M2. In some embodiments if it is determined during the power-up mode or during operation in the normal operational mode M1, that the backup control branch 520 suffers from a lack of integrity the mode control utilities 530 assume a further degraded operational mode M3. In this operational mode M3, the primary control branch 510 continues to provide the brake motor drive signal, but the backup control branch 520 is disabled, for example by disconnecting it from the power supply 560 using the backup input power supply switch 563B. Also in this case various, mutually non-exclusive options are available for configuring the mode control utilities for operation in the further degraded operational mode M3. According to one option the mode control utilities 530 alert the driver to take adequate steps, e.g. to drive to a garage and/or to reduce vehicle speed. According to an alternatively, or additional option, measures are provided that directly change the operation of the vehicle to impose safer driving conditions or to prevent further driving. In the embodiment shown the potential operational modes include a controlled power-off mode M4. If in any of the operational modes M01, M1, M2, M3 it is determined that neither the primary control branch 510 nor the backup control branch 520 meet integrity requirements the mode control utilities 530 assume the controlled power off mode M4, wherein the driver is enabled to bring the vehicle at stand-still. Therewith the remaining brakes that are still operational are used to apply a modest brake force that allows the driver to park the car without safety hazard. Also, in some embodiments, a brake unit controlling a brake motor at a side opposite the brake with the failing brake control unit 50 is disabled to avoid yaw forces.

Figure 4:
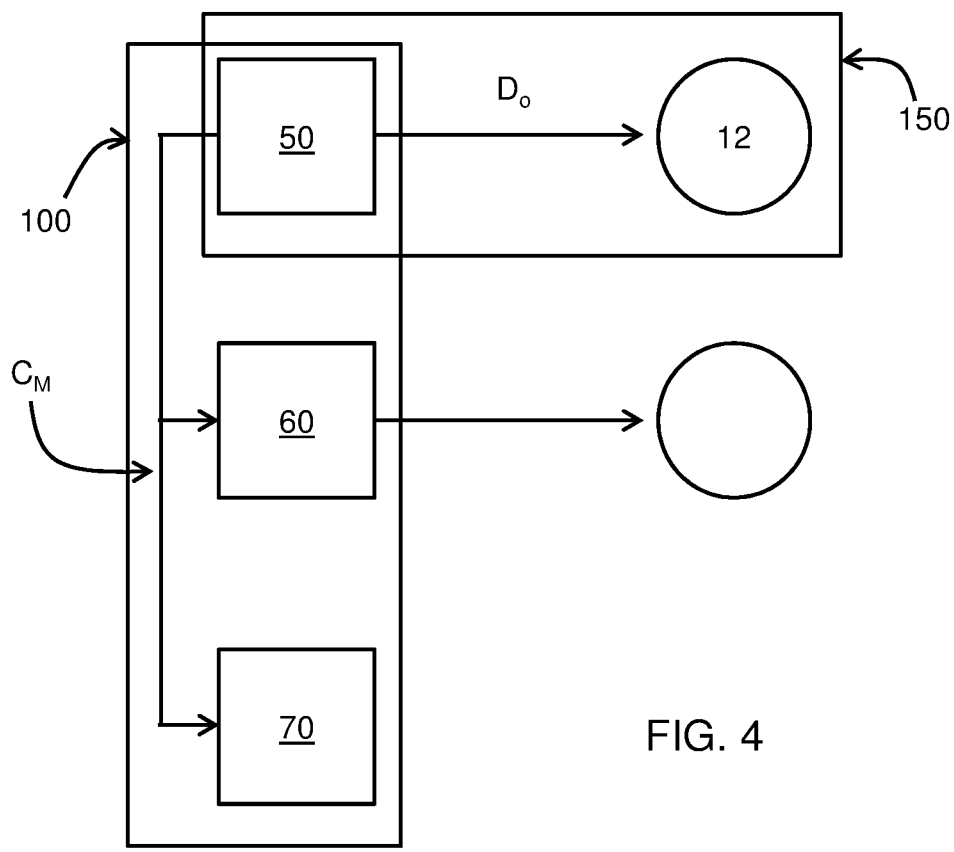
FIG. 4 schematically shows an example of a vehicle control system comprising an embodiment of the brake control unit.

FIG. 4 schematically shows a brake control system 150 comprising an electric brake having brake motor 12 and a brake control unit 50 as described for example with reference to FIG. 2, to drive the brake motor 12. In the example of FIG. 4, the brake control unit 50 is part of a vehicle control system 100 that controls various vehicle functions. The brake control unit 50 is configured to change an operational mode of at least one of said one or more additional control units 60, 70 in accordance with its own operational mode. In the example of FIG. 4 this is schematically indicated in that the brake control unit 50 provides a control signal CM to the one or more additional control units 60, 70. In practice various elements of the vehicle control system are configured to communicate to each other through a communication facility, e.g. a CAN bus, or a Bluetooth connection rather than dedicated control wires. In some embodiments, the additional control units may comprise a speed control unit 60 for controlling a speed of the vehicle. In examples of these embodiments the brake control unit 50, when determining that it is not in its normal operational mode controls the speed control unit 60 to impose a maximum on the speed with which the speed control unit 60 is capable to drive the vehicle. In other examples of these embodiments the mode control utilities 530 additionally or alternatively cause the vehicle control system 100 to discontinue vehicle operation upon determining that a predetermined time interval has lapsed and/or a predetermined distance was driven with the vehicle since its operational mode was no longer the normal operational mode. In some embodiments, the mode control utilities 530 provide the driver a grace period or restrict further driving to a maximum distance sufficient to drive the vehicle to a garage.

Figure 5:
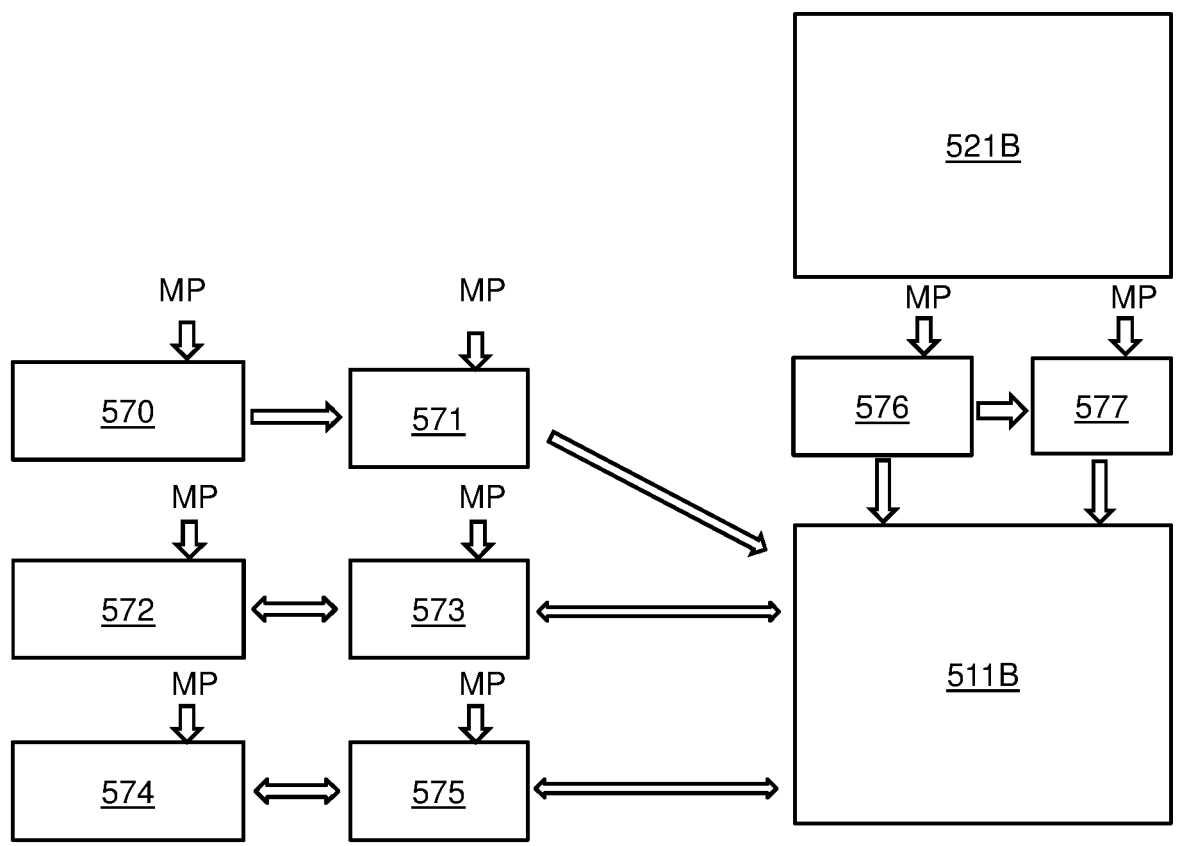
FIG. 5 and FIG. 6 shows further examples of operational modes in an embodiment of the brake control unit.
Figure 6:
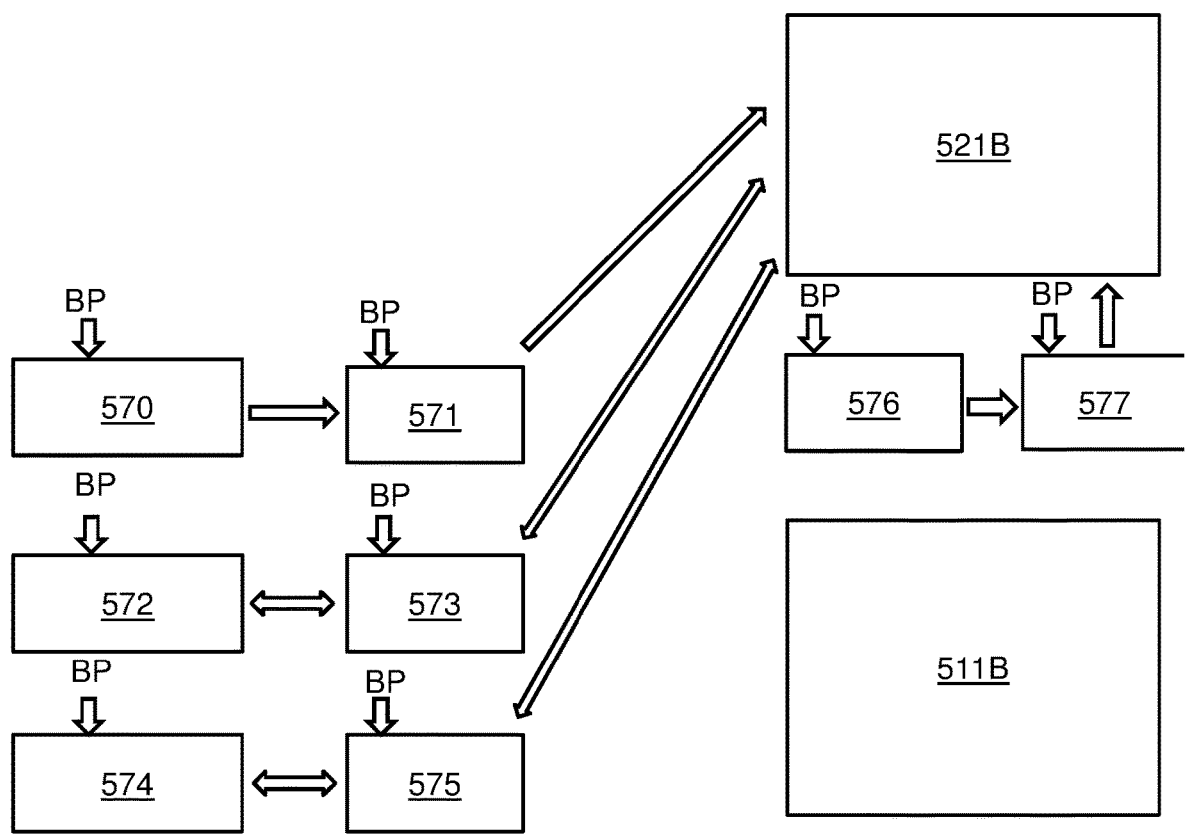

As illustrated in FIGS. 5 and 6 it is not necessary that all components in a control unit have a backup counterpart. In the embodiment of FIGS. 5 and 6 the following additional functional components are provided which are communicatively coupled to either one or both of the primary feedback controller 511B and the backup feedback controller 521B dependent on an operational mode. These functional components include:
A wheel speed interface 570
A first communication interface 572, e.g. a first CAN-bus.
A second communication interface 574, e.g. a second CAN-bus.
An motor angle sensor 576. In an embodiment the latter is a dual angle sensor. is provided therein.
For each of these functional components a respective signal and power switch 571, 573, 575, 577 is provided that controls a routing of input and/or output signals to either one or both of the primary feedback controller 511B and the backup feedback controller 521B dependent on an operational mode.

FIG. 5 shows an operational mode wherein the output signals of the wheel speed interface 570 and the angle sensor 576 are directed via their respective signal and power switch 571, 577 to the primary feedback controller 511B. Furthermore, in this mode the signal and power switches 573, 575 are configured to enable the primary feedback controller 511B to communicate bidirectionally via each of the first and the second communication interface 572, 574. It is presumed in the example of FIG. 5 that the operational mode is the normal operational mode M1, wherein power is supplied by the main power supply 561A, as schematically indicated by the symbol "MP". In a degraded operational mode wherein the main power supply 561A is defective, but wherein the primary control branch 510 is properly functioning, the additional functional components are supplied by the backup power supply 561B.

FIG. 6 shows a degraded operational mode selected in case of a defective primary control branch 510, e.g. M2 or M3, wherein instead the output signals of the wheel speed interface 570 and the angle sensor 576 are directed via their respective signal and power switch 571, 577 to the backup feedback controller 521B. Also, in these degraded operational modes the signal and power switches 573, 575 are configured to enable the backup feedback controller 521B to communicate bidirectionally via each of the first and the second communication interfaces 572, 574. It is presumed in the example of FIG. 6 that in these degraded operational modes also the main power supply 561A is defective. Accordingly, as denoted by the symbol "BP", power is supplied by the backup power supply 561B. In other cases, wherein the primary control branch 510 is defective, but wherein the main power supply 561A is healthy, power is typically supplied by the main power supply.

Exemplary embodiments of the power switches 571, 573, 575, 577 comprise switches, multiplexers, signal doublers, and/or other circuitry for routing or doubling signals. In the embodiment shown in FIG. 5, 6 it is presumed that either the primary feedback controller 511B (in FIG. 5) or the backup feedback controller 521B (in FIG. 6) is communicatively coupled to the functional components 570, 572, 574, 576. In other embodiments, the primary feedback controller 511B and the backup feedback controller 521B are both enabled to receive and/or send one or more signals. As an example, in an embodiment, in a normal operational mode the primary feedback controller 511B and the backup feedback controller 521B bot receive a motor angle signal from the motor angle sensor 576.

In some embodiments units and/or devices are implemented using hardware, software, and/or a combination thereof. Exemplary embodiments of hardware devices comprise processing circuitry such as, but not limited to, a processor, a central processing unit (CPU), a controller, an arithmetic logic unit (ALU), a digital signal processor, a microcomputer, a field programmable gate array (FPGA), a system-on-chip (SoC), a programmable logic unit, a microprocessor, or any other device capable of responding to and executing instructions in a defined manner.

Examples of software include a computer program, program code, instructions, or some combination thereof, for independently or collectively instructing or configuring a hardware device to operate as desired. Examples of a computer program and/or program code includes program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

Definitions $D_{10}$: primary motor drive signal
$D_{20}$: backup motor drive signal
$En_{510}$: primary branch enable signal
$En_{520}$: backup branch enable signal
$En_{516}$: control signal for the primary branch phase cutoff switch
$En_{526}$: control signal for the backup branch phase cutoff switch
$En_{563a}$: control signal for the primary branch input power supply switch 563a
$En_{563ab}$: control signal for the backup branch input power supply switch 563b
M0: power-off mode
M01: power-up mode
M1: normal operational mode
M2: degraded operational mode
M3: further degraded operational mode
M4: controlled power-off mode
$P_{ac1}$: primary control branch supply power
$P_{ac2}$: backup control branch supply power
1: primary gear
12: electric brake motor
30: brake transmission
40: brake mechanism
41: caliper
42: brake disc
50: brake control unit
60,70: additional control units
60: speed control unit
100: vehicle control system
150: electric brake system
510: primary control branch
511: primary control module
511a, 511b, 511c: primary control components
511a: power management controller
511b: primary feedback controller
511c: primary pre-driver
512: primary inverter
515: diagnostic utilities
515a, 515b, 515c: diagnostic units
516: primary branch phase cutoff switch
517: primary branch EMI-filter
520: backup control branch
521: backup control module
511a, 511b, 511c: backup control components
521a: backup power management controller
521b: backup feedback controller
521c: backup pre driver
522: backup inverter
526: backup branch phase cutoff switch
527: backup branch EMI-filter
530: mode control utilities
550: signal selector
561a: main battery package
561b: backup battery package
562: power source selector
563a: primary branch input power supply switch
563b: backup branch input power supply switch
570: wheel speed interface
571: signal and power switch for 570
572: first communication interface
573: signal and power switch for 572
574: second communication interface
575: signal and power switch for 574
576: motor angle sensor
577: signal and power switch for 576

The invention claimed is:

1. A brake control unit comprising a primary control branch, a backup control branch, diagnostic utilities and mode control utilities;
the primary control branch having a primary inverter and a primary control module to control operation of the primary inverter,
the backup control branch having a backup inverter and a backup control module to control operation of the backup inverter,
the diagnostic utilities being configured to determine an integrity status of both control branches and
the mode control utilities being configured to select, in accordance with said determination of the integrity status, an operational mode of the brake control unit from a plurality of potential operational modes, the potential operational modes comprising a normal operational mode and a degraded operational mode;
wherein respectively the primary control branch and the backup control branch are configured to generate a brake motor drive signal with their respective inverters being controlled by their respective control modules in response to an external brake control signal;
wherein the primary control module includes at least first and second mutually cooperating primary control components with respective first and second diagnostic units that are part of said diagnostic utilities in that the first diagnostic unit of the first primary control component is configured to diagnose an integrity of the second primary control component, and the second diagnostic unit of the second primary control component is configured to diagnose an integrity of the first primary control component;
wherein the diagnostic utilities further comprise a third diagnostic unit configured to diagnose an integrity status of the backup control branch by verifying a response signal of the backup control branch in response to a test signal.

2. The brake control unit according to claim 1, wherein the mode control utilities are configured to keep the backup control branch operational during the normal operational mode, and wherein the diagnostic utilities are configured to compare the response signal of the backup control branch with a reference response signal and reporting a lack of integrity of the backup control branch to the mode control utilities, if a substantial difference between said response signal and said reference response signal is measured.

3. The brake control unit according to claim 2, wherein the test signal simulates the external brake control signal.

4. The brake control unit according to claim 3, wherein
the response signal is indicative for a control signal provided by the backup control module to the backup inverter,
the reference response signal is indicative for a control signal provided by the primary control module to the primary inverter.

5. The brake control unit according to claim 3, wherein the mode control utilities are configured to enable both the primary control branch and the backup control branch to generate a brake motor drive signal, the brake control unit further comprising a respective phase cutoff switch that is controlled by the mode control utilities to select the brake motor drive signal from the primary control branch in the normal operational mode and to select the brake motor drive signal from the backup control branch in the degraded operational mode, wherein the response signal is indicative for the brake motor drive signal provided by the backup control branch, and wherein the reference response signal is indicative for the brake motor drive signal provided by the primary control branch.

6. The brake control unit according to claim 1, wherein the plurality of potential operational modes further comprises a power-up mode in which the diagnostic utilities provide a control signal to the backup control branch to cause the backup control branch to generate a brake motor drive signal, in which the mode control utilities temporarily enable the backup control branch to drive a brake motor with the brake motor drive signal, and in which the diagnostic utilities diagnose an operation of the backup control branch by verifying an operation of the brake motor in response to the brake motor drive signal.

7. The brake control unit according to claim 1, wherein the plurality of potential operational modes includes at least a further degraded operational mode, in which the mode control utilities select the primary control branch as the source of the brake motor drive signal, and wherein the mode control utilities select the further degraded operational mode if the diagnostic utilities determine a lack of integrity with the backup control branch and determine that the primary control branch meets integrity requirements.

8. The brake control unit according to claim 7, wherein the mode control utilities fully disable operation of the backup control branch in said further degraded operational mode.

9. The brake control unit according to claim 1, wherein the backup control branch has limited auto diagnostic capabilities comprising one or more of checksum verification and detection of out-of-bound signals.

10. The brake control unit according to claim 1, wherein the first primary control component is a power management controller and the second primary control component is a micro controller for feedback control of the brake motor.

11. An electric brake system comprising a brake control unit and a vehicle brake motor controlled by the brake control unit; the brake control unit comprising a primary control branch, a backup control branch, diagnostic utilities and mode control utilities;
the primary control branch having a primary inverter and a primary control module to control operation of the primary inverter,
the backup control branch having a backup inverter and a backup control module to control operation of the backup inverter,
the diagnostic utilities being configured to determine an integrity status of both control branches and
the mode control utilities being configured to select, in accordance with said determination of the integrity status, an operational mode of the brake control unit from a plurality of potential operational modes, the potential operational modes comprising a normal operational mode and a degraded operational mode;
wherein respectively the primary control branch and the backup control branch are configured to generate a brake motor drive signal with their respective inverters being controlled by their respective control modules in response to an external brake control signal;
wherein the primary control module includes at least first and second mutually cooperating primary control components with respective first and second diagnostic units that are part of said diagnostic utilities in that the first diagnostic unit of the first primary control component is configured to diagnose an integrity of the second primary control component, and the second diagnostic unit of the second primary control component is configured to diagnose an integrity of the first primary control component;
wherein the diagnostic utilities further comprise a third diagnostic unit configured to diagnose an integrity status of the backup control branch by verifying a response signal of the backup control branch in response to a test signal.

12. A vehicle control system comprising the electric brake system according to claim 11 and one or more additional control units to control additional vehicle functions, wherein the brake control unit is configured to change an operational mode of at least one of said one or more additional control units in accordance with its own operational mode.

13. The vehicle control system according to claim 12, wherein said one of the one or more additional control units is a speed control unit for controlling speed of the vehicle, wherein the brake control unit in an operational mode other than its normal operational mode imposes a maximum on the vehicle's speed with which the speed control unit is enabled to drive the vehicle.

14. The vehicle control system according to claim 12, wherein the brake control unit causes the vehicle control system to discontinue vehicle operation upon determining that a predetermined time interval has lapsed and/or a predetermined distance was driven with the vehicle since its operational mode was no longer the normal operational mode.

15. The electric brake system according to claim 11, wherein the mode control utilities are configured to keep the backup control branch operational during the normal operational mode, and wherein the diagnostic utilities are configured to compare the response signal of the backup control branch with a reference response signal and reporting a lack of integrity of the backup control branch to the mode control utilities if a substantial difference between said response signal and said reference response signal is measured.

16. The electric brake system according to claim 11, wherein the plurality of potential operational modes further comprises a power-up mode in which the diagnostic utilities provide a control signal to the backup control branch to cause the backup control branch to generate a brake motor drive signal, in which the mode control utilities temporarily enable the backup control branch to drive a brake motor with the brake motor drive signal, and in which the diagnostic utilities diagnose an operation of the backup control branch by verifying an operation of the brake motor in response to the brake motor drive signal.

17. The electric brake system according to claim 11, wherein the plurality of potential operational modes includes at least a further degraded operational mode, in which the mode control utilities select the primary control branch as the source of the brake motor drive signal, and wherein the mode control utilities select the further degraded operational mode if the diagnostic utilities determine a lack of integrity with the backup control branch and determine that the primary control branch meets integrity requirements.

18. The electric brake system according to claim 11, wherein the backup control branch has limited auto diagnostic capabilities comprising one or more of checksum verification and detection of out-of-bound signals.

19. The electric brake system according to claim 11, wherein the first primary control component is a power management controller and the second primary control component is a micro controller for feedback control of the brake motor.

20. Method of controlling a brake motor for a vehicle, comprising generating a brake motor drive signal in response to an external brake control signal, the method comprising:

providing a primary control branch, a backup control branch, the primary control branch having a primary inverter and a primary control module to control operation of the primary inverter, the primary control module including at least a first and a second mutually cooperating primary control component, and the backup control branch having a backup inverter and a backup control module to control operation of the backup inverter;

selecting an operational mode, in accordance with determination of an integrity status of both control branches, from a plurality of potential operational modes, the potential operational modes comprising a normal operational mode and a degraded operational mode, during the normal operational mode and enabling the primary control branch to exclusively generate the brake motor drive signal in response to the external brake control signal, in which the normal operational mode determining an integrity status comprises:

the at least a first and a second mutually cooperating primary control component diagnosing each other's integrity status, and the primary control branch further diagnosing an integrity status of the backup control branch by verifying a response signal of the backup control branch in response to a test signal, during the degraded operational mode and enabling the backup control branch to exclusively generate the brake motor drive signal in response to the external brake control signal.

* * * * *